United States Patent Office 2,909,428
Patented Oct. 20, 1959

2,909,428

THERMOCOUPLE ELEMENT

Norman F. Spooner, Bloomfield Township, Oakland County, and Forbes S. Sibley, Birmingham, Mich., assignors to Hoskins Manufacturing Company, Detroit, Mich., a corporation of Michigan No Drawing. Application October 10, 1957
Serial No. 689,272

6 Claims. (Cl. 75—171)

This invention relates to a thermocouple element and more particularly to an electropositive thermocouple element interchangeable with the standard Chromel-P of a Chromel-Alumel couple.

The standard positive thermocouple element known as Chromel-P used in the conventional Chromel-Alumel thermocouple has a nominal composition of 90% nickel and 10% chromium. This alloy contains other minor constituents such as silicon, carbon, iron and zirconium which must be closely controlled in content so that the thermocouple will produce the accepted standard E.M.F.'s prescribed for such thermocouples. The use of Chromel-P elements in thermocouples has been very extensive for many years. Their widespread use is attributable to the desirable qualities of this alloy, among which are its relatively high thermal E.M.F. values and the fact that the E.M.F. vs. temperature curve is a substantially straight line. The latter quality is especially desirable because it simplifies considerably furnace control instrumentation as compared with other electropositive thermocouple elements whose E.M.F. vs. temperature curve is not a straight line.

It has been found that when a thermocouple which includes one element having a composition of the standard Chromel-P element or other compositions essentially of nickel and chromium is subjected to certain atmospheric conditions at certain critical temperature ranges usually above 1500° F., the E.M.F. produced by the thermocouple varies with time from the standard E.M.F.'s prescribed for such thermocouples. In some instances, this deviation from the standard prescribed curve occurs rather rapidly. Investigations have shown that such deviations may be attributed to various phenomena including green rot corrosion, sulfur attack, carburization, oxidation and vaporization of the chromium from the alloy.

The present invention has for its object the provision of an electropositive thermocouple element which will conform to the standard E.M.F. vs. temperature curve prescribed for Chromel-P elements and at the same time produce a minimum deviation from the standard curve when subjected to the conditions above referred to so that the element possesses a maximum stability at elevated temperatures; that is, in the range of 1500° F. and above.

In the evaluation of the usefulness of a thermocouple element to be used under corrosive conditions at elevated temperatures, the stability of the element under the following tests is highly indicative.

(1) *Green rot corrosion test in long narrow Inconel protection tubes.*—When a thermocouple element of the nickel-chromium type is used at elevated temperatures in long narrow protection tubes, oxidation of the metal depletes the supply of oxygen in the tube due to poor circulation. The low partial pressure of the oxygen causes preferential oxidation of the chromium characterized by intergranular oxidation, embrittlement and increased magnetic response. This condition is referred to as green rot. Green rot lowers the effective chromium content of the alloy and changes its thermal E.M.F. In this test, thermocouple elements were inserted in long Inconel protection tubes with insulators surrounding the thermocouples. The tubes were brought up to a temperature of 2150° F. and held at that temperature for twenty-four hours. The thermocouples were cooled in the furnace at the end of the run and then checked for magnetic response and E.M.F. change. The following typical results show the effect on stability of various columbium additions.

TABLE I

*Results of green rot corrosion test in long narrow Inconel protection tubes*

| Material | Change in 2,000° F. E.M.F. vs. Pt. of 18 Gage Bright Wire (mv.) | Increase in Magnetometer Reading [1] (micro amperes) |
|---|---|---|
| Standard Chromel P | −1.50 | 46 |
| Chromel P +0.4% Cb | +0.01 | 8 |
| Chromel P +0.6% Cb | −0.01 | 3 |
| Chromel P +0.9% Cb | −0.15 | 30 |

[1] All samples were non-magnetic before the test.

(2) *Sulfur corrosion test.*—This test consists of holding strip specimens of the alloy at 2000° F. for two hours in an atmosphere of hydrogen and hydrogen sulfide. The extent of the sulfur attack is measured by the increase in magnetic response and by the gain in weight of the specimens. Metallographic inspection for depth of the attack is also useful. The following are typical results showing the effect of various columbium additions on the susceptibility of sulfur corrosion.

TABLE II

*Sulfur corrosion test results* [1]

| Material | Weight Gain (mg.) | Depth of Penetration (Mils) | Maximum Magnetometer Reading |
|---|---|---|---|
| Standard Chromel P | 105.7 | 4.0 | 224 |
| Chromel P +0.4% Cb | 81.5 | 2.5 | 120 |
| Chromel P +0.6% Cb | 80.5 | 2.5 | 85 |
| Chromel P +0.9% Cb | 93.9 | 3.5 | 150 |

[1] Tests run on ¼" x .030" bright finish strip.

(3) *"Green rot" in evacuated ampules.*—In this test, carefully weighed, bright, oil- and dirt-free strips of the alloy were inserted into rolled up pieces of carefully weighed and uniformly pre-oxidized nickel foil. The nickel foil and alloy strip were then inserted in a quartz thermocouple tip, the tip evacuated to about .05 mm. of mercury, heated to drive off traces of moisture and finally sealed to form an evacuated ampule enclosing the sample. These samples were then subjected to temperatures from 1620° F. to 1920° F. for forty-eight hours. The green rot attack was measured by noting the increase in magnetic response and the gain in weight of the specimens. The following are typical results,

TABLE III

*Green rot test in evacuated ampules held for 48 hours at indicated temperatures*

| Material | Test° Temp. F. | Wt. Gain of Sample (mg.) | Increase in Magnetometer Reading (Micro Amps.) |
|---|---|---|---|
| Standard Chromel P | 1,620 | 0.4 | 6 |
|  | 1,720 | 0.5 | 5 |
|  | 1,820 | 5.5 | 40 |
|  | 1,920 | 2.2 | 11 |
| Chromel P + 0.4% Cb | 1,620 | −0.6 | 3 |
|  | 1,720 | 1.1 | 3 |
|  | 1,820 | 0.9 | 2 |
|  | 1,920 | 0.7 | 2 |
| Chromel P + 0.6% Cb | 1,620 | 0.5 | 2 |
|  | 1,720 | 2.2 | 16 |
|  | 1,820 | 0.5 | 2 |
|  | 1,920 | 0.6 | 1 |
| Chromel P + 0.9% Cb | 1,620 | 1.2 | 8 |
|  | 1,720 | 0.7 | 4 |
|  | 1,820 | 1.5 | 5 |
|  | 1,920 | 2.2 | 14 |

(4) *High temperature vaporization test.*—In this test, wire samples were heated for a period of one hour at 2150° F. at a pressure of 1 micron of mercury. The loss in the weight of the samples was measured and this loss was found to be chiefly a loss in chromium which exerts a high vapor pressure relative to the other components of these types of alloys. The results obtained with various columbium additions are tabulated below.

TABLE IV

*Vaporization test on 22 gage bright wires held at 2150° F. for two hours at a pressure of 1 micron Hg*

| Material | Loss of Weight (mg.) |
|---|---|
| Standard Chromel P | 5.3 |
| Chromel P + 0.4% Cb | 1.5 |
| Chromel P + 0.6% Cb | 1.5 |
| Chromel P + 0.9% Cb | 11.7 |

The above tests are deemed to be important in evaluating the usefulness of a nickel-chromium type thermocouple element because experience has shown that under the above conditions, a marked instability of the E.M.F. produced by elements made of such alloys has been observed.

Heretofore, it has been suggested that the corrosion resistance and the E.M.F. stability of thermocouple elements having various nickel-chromium compositions may be greatly improved by the addition of columbium or silicon in amounts from .2% to 2% and also the addition of other metals such as iron and manganese in amounts up to 2%. While somewhat improved results may be obtained with some nickel-chromium type alloys, none of the improved alloys heretofore suggested possess the desirable properties of the Chromel-P alloy; namely, a high thermal E.M.F. coupled with a substantially straight line relationship between the thermal E.M.F. and the temperature.

We have found that additions of columbium in the relative narrow range of .15% to .65% to the nominal Chromel-P composition produce an electropositive thermocouple element, the thermal E.M.F. of which has an overall stability at elevated temperatures superior to the alloys heretofore suggested. At the same time, we have found that in order to conform the E.M.F. vs. temperature curve of the improved alloy of this invention to the standard curve prescribed for a Chromel-P element, the composition of the standard Chromel-P alloy must be modified. One way of accomplishing this is by reducing the chromium by about 62% of the columbium addition and, at the same time, reducing the silicon content by about 25% of the columbium addition.

Thus, whereas the composition of the standard Chromel-P alloy is usually stated as chromium 9.0% to 10.0%; silicon .25% to .50%; iron .25% to .75%; zirconium .05% to .15%; carbon less than .05%; balance nickel, the compositional limits of the novel element of the present invention are as follows: chromium 8.6% to 10.0%; silicon .05% to .50%; columbium .15% to .65%; iron .25% to .75%; zirconium .05% to .15%; carbon less than .05%; balance nickel.

Standard Chromel-P and thermocouple elements having the composition set forth above for the new alloy of this invention were subjected together with other alloys having a greater and a lesser columbium content than the new alloy, a greater silicon content, a greater iron content and a greater manganese content than standard Chromel-P to the above described green rot test in long narrow Inconel tubes and the sulfur corrosion test, and the alloy of the present invention proved far superior. Columbium additions of less than .15% or more than .65% produced elements having less stability at elevated temperatures than those within this range, and these results were confirmed in the evacuated ampule tests and vaporization tests as cited. Silicon in the amount of 1.5% indicated a fairly stable element with reference to green rot corrosion, but the E.M.F. produced at 2000° F. deviated so substantially from the standard curve that it would be impossible to compensate for by other changes in the composition. Thus, silicon proved to be unsuitable for an element having the above described advantages of the standard Chromel-P element. Additions of manganese showed very low stability towards sulfur attack. Iron additions proved valueless because of their low resistance to green rot corrosion. On the basis of extensive tests conducted with all of the above alloys, the thermocouple elements having the best overall properties contain columbium in the range of between .25% and .55%; and this constitutes the preferred compositional limits.

However, as indicated above, a Chromel-P type element containing columbium in an amount between .15% and .65% is definitely superior to alloys of this type containing more and containing less than this range of columbium. While columbium is the preferred addition, equally good results have been obtained by substituting for columbium the same addition of a combination of columbium and its equivalent element, tantalum. The actual addition is the iron alloy of these elements, either ferro-columbium or ferro-columbium-tantalum; and the addition is based upon the percentage of columbium in the ferro-columbium and the percentage of columbium and tantalum in the ferro-columbium-tantalum. Thus, where columbium is called for in this description or in the appended claims, the term is so used to include either columbium alone or columbium plus tantalum.

To prepare the alloy, the Ni is first melted, deoxidized and degasified by the usual agents employed for the purpose. The chromium and ferro-columbium are then added to produce the desired chromium and columbium contents without undue loss. After a final deoxidation step, the silicon and zirconium are added. Thermocouple elements are produced from the alloy by any known process such as drawing the hot-rolled metal to wire.

We claim:

1. A thermocouple containing a positive element composed of an alloy containing from 8.6% to 10% chromium; .15% to .65% columbium; and the balance substantially all nickel.

2. A thermocouple containing a positive element composed of an alloy containing from 8.6% to 10% chromium; .25% to .55% columbium; and the balance substantially all nickel.

3. A thermocouple containing a positive element composed of an alloy containing from 8.6% to 10% chromium; .05% to .50% silicon; .15% to .65% columbium; and the balance substantially all nickel.

4. A thermocouple containing a positive element composed of an alloy containing from 8.6% to 10% chromium; .05% to .50% silicon; .25% to .55% columbium; and the balance substantially all nickel.

5. A thermocouple containing a positive element composed of an alloy containing from 8.6% to 10% chromium; .05% to .50% silicon; .15% to .65% columbium; .25% to .75% iron; .05% to .15% zirconium; and the balance substantially all nickel.

6. A thermocouple containing a positive element composed of an alloy containing from 8.6% to 10% chromium; .05% to .50% silicon; .25% to .55% columbium; .25% to .75% iron; .05% to .15% zirconium; and the balance substantially all nickel.

References Cited in the file of this patent

FOREIGN PATENTS

| | | |
|---|---|---|
| 304,371 | Great Britain | Jan. 21, 1929 |
| 511,565 | Great Britain | Aug. 21, 1939 |